United States Patent
Liu et al.

(10) Patent No.: US 10,211,948 B2
(45) Date of Patent: Feb. 19, 2019

(54) LDPC TONE MAPPING SCHEMES FOR DUAL-SUB-CARRIER MODULATION IN WLAN

(71) Applicant: MEDIATEK INC., Hsinchu (TW)

(72) Inventors: Jianhan Liu, San Jose, CA (US); Shengquan Hu, Cupertino, CA (US); Tianyu Wu, Fremont, CA (US); Thomas Edward Pare, Jr., Mountain View, CA (US)

(73) Assignee: MEDIATEK INC., Hsin-Chu (TW)

( * ) Notice: Subject to any disclaimer, the term of this patent is extended or adjusted under 35 U.S.C. 154(b) by 97 days.

(21) Appl. No.: 15/290,135

(22) Filed: Oct. 11, 2016

(65) Prior Publication Data
US 2017/0104553 A1    Apr. 13, 2017

Related U.S. Application Data

(60) Provisional application No. 62/240,413, filed on Oct. 12, 2015.

(51) Int. Cl.
*H04L 1/00* (2006.01)
*H04L 27/00* (2006.01)
(Continued)

(52) U.S. Cl.
CPC ........ *H04L 1/0041* (2013.01); *H04L 27/0008* (2013.01); *H04L 27/2613* (2013.01);
(Continued)

(58) Field of Classification Search
CPC .............. H04W 72/0453; H04W 84/12; H04L 1/0041; H04L 27/0008; H04L 27/2601
See application file for complete search history.

(56) References Cited

U.S. PATENT DOCUMENTS

| 7,126,533 B2 | 10/2006 | Fiore et al. |
| 8,213,527 B2 | 7/2012 | Wang et al. |

(Continued)

FOREIGN PATENT DOCUMENTS

| CN | 102149192 | 8/2011 |
| CN | 105939186 A | 9/2016 |

(Continued)

OTHER PUBLICATIONS

EPO, Search Report for the EP patent application 16193438.5 dated Mar. 17, 2017 (9 pages).
(Continued)

*Primary Examiner* — Min Jung

(57) ABSTRACT

A new lower density parity check (LDPC) tone mapper is proposed when DCM is applied for a given resource unit (RU) when LDPC is used as the channel control coding. For HE PPDU transmission with DCM, LDPC encoded streams are first modulated by a DCM constellation mapper. The modulated symbols of the lower half of the frequency segment and the modulated symbols of the upper half of the frequency segment are modulated using the same LDPC encoded bits using DCM mapping. The modulated symbols of the lower half of the frequency segment are mapped to lower half of the data subcarriers using DCM LDPC tone mapper. The modulated symbols of the upper half of the frequency segment are mapped to upper half of the data subcarriers using the same DCM LDPC tone mapper. Maximum frequency diversity for DCM can be achieved.

20 Claims, 5 Drawing Sheets

(51) Int. Cl.
*H04L 27/26* (2006.01)
*H04W 72/04* (2009.01)
*H04W 84/12* (2009.01)

(52) U.S. Cl.
CPC ...... *H04L 27/2626* (2013.01); *H04L 27/2601* (2013.01); *H04W 72/0453* (2013.01); *H04W 84/12* (2013.01)

(56) References Cited

U.S. PATENT DOCUMENTS

| | | | |
|---|---|---|---|
| 8,619,641 B2 | 12/2013 | Guo | |
| 8,929,192 B2 | 1/2015 | Kainulainen et al. | |
| 9,615,214 B2 | 4/2017 | Syrjarinne et al. | |
| 9,647,868 B2 | 5/2017 | Jiao et al. | |
| 2001/0006540 A1 | 7/2001 | Kim et al. | |
| 2006/0158374 A1 | 7/2006 | Rahamin et al. | |
| 2008/0191941 A1 | 8/2008 | Saban et al. | |
| 2008/0232485 A1 | 9/2008 | Niu et al. | |
| 2009/0122890 A1* | 5/2009 | Wu | H04L 27/0008 375/261 |
| 2010/0246720 A1 | 9/2010 | Wang et al. | |
| 2011/0033004 A1* | 2/2011 | Wang | H04L 27/2626 375/261 |
| 2011/0193739 A1 | 8/2011 | Strauch et al. | |
| 2011/0243197 A1 | 10/2011 | Atarashi et al. | |
| 2011/0261858 A1 | 10/2011 | Baldemair et al. | |
| 2011/0274003 A1 | 11/2011 | Pare, Jr. et al. | |
| 2012/0258669 A1 | 10/2012 | Honkanen et al. | |
| 2012/0263211 A1 | 10/2012 | Porat et al. | |
| 2013/0070701 A1 | 3/2013 | Merlin et al. | |
| 2013/0089121 A1* | 4/2013 | Koo | H04L 27/06 375/150 |
| 2013/0265907 A1 | 10/2013 | Kim et al. | |
| 2013/0321209 A1 | 12/2013 | Kalliola et al. | |
| 2013/0343211 A1 | 12/2013 | Liu et al. | |
| 2014/0070996 A1 | 3/2014 | Kneckt et al. | |
| 2014/0219449 A1 | 8/2014 | Shattil et al. | |
| 2014/0254648 A1 | 9/2014 | Van Nee | |
| 2014/0328335 A1 | 11/2014 | Zhang | |
| 2015/0023449 A1 | 1/2015 | Porat et al. | |
| 2015/0124739 A1 | 5/2015 | Baik et al. | |
| 2015/0139091 A1 | 5/2015 | Azizi et al. | |
| 2015/0139115 A1 | 5/2015 | Seok | |
| 2015/0230231 A1 | 8/2015 | Fornoles, Jr. | |
| 2015/0296516 A1 | 10/2015 | Jung | |
| 2016/0014763 A1 | 1/2016 | Jauh et al. | |
| 2016/0021568 A1 | 1/2016 | Yu et al. | |
| 2016/0033614 A1 | 2/2016 | Wang et al. | |
| 2016/0047885 A1 | 2/2016 | Wang et al. | |
| 2016/0065467 A1* | 3/2016 | Wu | H04L 65/60 370/392 |
| 2016/0248542 A1 | 8/2016 | Liu et al. | |
| 2016/0249165 A1 | 8/2016 | Aldana | |
| 2016/0323060 A1* | 11/2016 | Hassanin | H04L 1/0041 |
| 2016/0330055 A1* | 11/2016 | Tong | H04W 84/12 |
| 2016/0352552 A1* | 12/2016 | Liu | H04B 1/7176 |
| 2016/0366548 A1 | 12/2016 | Wang et al. | |
| 2016/0370450 A1 | 12/2016 | Thorn et al. | |
| 2017/0064718 A1 | 3/2017 | Bharadwaj et al. | |
| 2017/0070893 A1 | 3/2017 | Wang et al. | |
| 2017/0070998 A1 | 3/2017 | Wu et al. | |
| 2017/0093546 A1 | 3/2017 | Wu et al. | |
| 2017/0099089 A1 | 4/2017 | Liu et al. | |
| 2017/0104553 A1 | 4/2017 | Liu et al. | |
| 2017/0134207 A1 | 5/2017 | Liu et al. | |
| 2017/0171363 A1 | 6/2017 | Sun et al. | |
| 2017/0171796 A1 | 6/2017 | Wu et al. | |
| 2017/0180177 A1 | 6/2017 | Wu et al. | |
| 2017/0214507 A1 | 7/2017 | Kang et al. | |
| 2017/0215087 A1 | 7/2017 | Amizur et al. | |
| 2017/0230220 A1 | 8/2017 | Anwyl et al. | |
| 2017/0230981 A1* | 8/2017 | Ryu | H04W 74/00 |
| 2018/0013527 A1* | 1/2018 | Sun | H04L 27/2613 |

FOREIGN PATENT DOCUMENTS

| | | |
|---|---|---|
| EP | 3098999 A1 | 5/2015 |
| WO | 2004049498 | 6/2004 |
| WO | 2010022785 | 3/2010 |
| WO | 2015069811 | 5/2015 |
| WO | 2015077042 | 5/2015 |
| WO | 2016178534 | 11/2016 |
| WO | 2017003229 | 1/2017 |
| WO | 2017027479 | 2/2017 |
| WO | 2017035235 | 3/2017 |

OTHER PUBLICATIONS

Tim Schmidl, "Clause 6 OFDM PHY Draft", Jan. 2010 IEEE P802.15-10-0013-00-004g, IEEE P802.15 Wireless Personal Area Networks, Project IEEE P802.15 Working Group for Wireless Personal Area Networks (WPANs).
M. Rahaim et al., WiFi PHY Standards Review—from Early 802.11 to 'ac' and 'ad', MCL Technical Report No. 04-29-2014.
Darryn Lowe et al., "Analysis and evaluation of MB-OFDM Dual Carrier Modulation", Telecommunications Information Technology Research Institute, University of Wollongong.
EPO, Search Report for the EP Patent Application 16191047.6 Dated Feb. 14, 2017 (7 Pages).
EPO, Search Report for the EP Patent Application 15833049.8 Dated Feb. 16, 2018 (9 Pages).
International Search Report and Written Opinion of International Search Authority for PCT/CN2015/087365 Dated Nov. 24, 2015 (10 Pages).
EPO, Search Report for the EP Patent Application 16187569.5 Dated Jan. 23, 2017 (12 Pages).
EPO, Search Report for the EP Patent Application 16192182.0 Dated Feb. 1, 2017 (10 Pages).
Joonsuk Kim, Apple, HE-SIG-B Structure, Doc.: IEEE 802.11-15/0821R2, Jul. 2015 Slides 8-15.
EPO, Search Report for the EP Patent Application 16197315.1 Dated Mar. 31, 2017 (8 Pages).
IEEE 802.11-15/1530R0 (Nov. 2015) pp. 2 and 3.
IEEE STD 802.11 AC-2013 (Dec. 18, 2013) pp. ii and 99.
Richard Van Nee, 5G Out Look—Innovations and Applications: Chapter 12-802.11AX for 5G, May 15, 2016, pp. 179-193 PAE 190, Lines 5-10.
Joonsuk Kim, et al., HE-SIG-B Structure, Doc.: IEEE 802.11-15/0821R2, Sep. 2015 Slides 11-15.
Robert Stacey, Specification Framework for TGAX, Jan. 21, 2016, Doc.: IEEE 802.11-15/013214, p. 23, Section 3.3.3 p. 24, Section 3.3.4.
EPO, Search Report for the EP Patent Application 16187569.5 Dated Nov. 9, 2017(6 Pages).
Kaushik Josiam et al., HE-SIG-B Contents, Doc.: IEEE802.11-15/1066R0, Sep. 2015, Slide 8 Slides 10, 11 Slide 17.
Katsuo Yunoki, KDDI R&D Laboratories, Considerations on HE-SIG-A/B, Doc.: IEEE 802.11-15/827R2, Jul. 2015 Slides 2-11.
Robert Stacey, Intel, Specification Framework for TGAX, IEEE P802.11 Wireless LANS, Doc.: IEEE 802.11-15/0132R8, Sep. 2015. Paragraph [3.2.4].
Jianhan Liu et al., Reliable Dual Sub-Carrier Modulations (DCM) for HE-SIG-B and Data , Sep. 12, 2015, Doc.: IEEE 802.11-15/1068R1, pp. 11-12 pp. 6, 18.
EPO, Search Report for the EP Patent Application 17154548.6 Dated Jun. 30, 2017 (7 Pages).
Robert Stacey, Intel, Specification Framework for TGAX, IEEE P802.11 Wireless LANS, Jul. 2015 p. 3, Line 25-39, p. 4, Line 1-5, Sections 3.2.2, 3.2.3, 3.3.2, 4.1.
Young Hoon Kwon, Newracom, SIG Field Design Principle for 11AZ, Doc.: IEEE 802.11-15/0344R2, Mar. 2015 Slides 5-14.
WiFi PHY standards review—from early 802.11 to 'ac' and 'ad'. M. Rahaim and T.D.C. Little Department of Electrical and Computer Engineering Boston University, Boston, MA 02215 {mrahaim, tdcl}@bu.edu. MCL Technical Report No. 04-29-2014. 12 pp.

(56) References Cited

OTHER PUBLICATIONS

IEEE P802.15. Wireless Personal Area Networks Project IEEE P802.15. Working Group forWireless Personal Area Networks. Jan. 2010 IEEE P802.15-10-0013-00-004g.

* cited by examiner

| RU size (tones) | DCM | | LDPC | LDPC (with (DCM) |
|---|---|---|---|---|
| | $N_{Data}$ | $N_{Data-DCM}$ | $D_{TM}$ | $D_{TM-DCM}$ |
| 26 | 24 | 12 | 1 | 1 |
| 52 | 48 | 24 | 3 | 1 |
| 106 | 102 | 51 | 6 | 3 |
| 242 | 254 | 117 | 9 | 9 |
| 484 | 468 | 234 | 12 | 9 |
| 996 | 980 | 490 | 20 | 14 |

LDPC TONE MAPPING SCHEMES FOR DUAL-SUB-CARRIER MODULATION IN WLAN

CROSS REFERENCE TO RELATED APPLICATIONS

This application claims priority under 35 U.S.C. § 119 from U.S. Provisional Application No. 62/240,413, entitled "LDPC Tone Mapping Schemes for Dual-Sub-Carrier Modulation in WLAN," filed on Oct. 12, 2015, the subject matter of which is incorporated herein by reference.

TECHNICAL FIELD

The disclosed embodiments relate generally to wireless network communications, and, more particularly, to LDPC tone mapping for dual subcarrier modulation (DCM) in wireless communications systems.

BACKGROUND

IEEE 802.11 is a set of media access control (MAC) and physical layer (PHY) specification for implementing wireless local area network (WLAN) communication in the Wi-Fi (2.4, 3.6, 5, and 60 GHz) frequency bands. The 802.11 family consists of a series of half-duplex over-the-air modulation techniques that use the same basic protocol. The standards and amendments provide the basis for wireless network products using the Wi-Fi frequency bands. For example, IEEE 802.11ac is a wireless networking standard in the IEEE 802.11 family providing high-throughput WLANs on the 5 GHz band. Significant wider channel bandwidths (20 MHz, 40 MHz, 80 MHz, and 160 MHz) were proposed in the IEEE 802.11ac standard. The High Efficiency WLAN study group (HEW SG) is a study group within IEEE 802.11 working group that will consider the improvement of spectrum efficiency to enhance the system throughput in high-density scenarios of wireless devices. Because of HEW SG, TGax (an IEEE task group) was formed and tasked to work on IEEE 802.11ax standard that will become a successor to IEEE 802.11ac. Recently, WLAN has seen exponential growth across organizations in many industries.

Orthogonal Frequency Division Multiple Access (OFDMA) is introduced in HE WLAN to enhance the user experiences by assigning subsets of subcarriers to different users, allowing simultaneous data transmission by several users. In OFDMA, each user is assigned with a group of subcarriers called a resource unit (RU). In HE WLAN, a wireless station (STA) can transmit one minimum size RU (which is about 2 MHz bandwidth) in uplink and downlink OFDMA. Compared to its 20 MHz preamble, the power density of its data portion is 9 dB higher than its preamble. This narrow band uplink OFDMA signal is hard to be detected by CCA because CCA is operated on bandwidth that is greater or equal to 20 MHz. Therefore, one STA can experience 9 dB higher interferences on subcarriers in a particular narrow band than other subcarriers. It can be seen that narrow band interferences are intrinsic in HE WLAN. A scheme to deal with such narrow band interferences is needed.

In Multi-User (MU) transmissions, performance of HE-SIG-B is encoded using 1× symbol duration. As a result, its performance is worse than data symbol with 4× symbol duration when used the same modulation and coding scheme (MCS). A more robust modulation scheme is needed for HE-SIGB. In addition, to extend the range for outdoor scenarios, a new modulation scheme that can operate at lower SNR than MCS0 is also desired.

Dual Sub-Carrier Modulation (DCM) modulates the same information on a pair of subcarriers. DCM can introduce frequency diversity into OFDM systems by transmitting the same information on two subcarriers separated in frequency. DCM can be implemented with low complexity and provide better performance than existing modulation schemes used in WLAN. DCM enhances the reliability transmissions, especially under narrow band interferences. In information theory, a low-density parity-check (LDPC) code is a linear error correcting code, a method of transmission over a noisy transmission channel. LDPC codes are commonly used in WLANs and OFDM systems. In HE WLAN, when bandwidth is larger than 20 MHz, LDPC becomes the mandatory error control coding scheme.

In the next generation WLAN systems that is based on upcoming IEEE 802.11ax standards, each STA can transmit signals using one or more RU. When DCM is applied for a given RU, a transmission procedure with a new LDPC tone mapping scheme is desired to facilitate the enhanced transmission reliability under DCM.

SUMMARY

Dual sub-carrier modulation (DCM) is introduced in HE WLAN. DCM is a solution to deal with narrow band interferences and for range extension. DCM can introduce frequency diversity into OFDM systems by transmitting the same information on two subcarriers separated in frequency. If DCM is applied, then the transmitter modulates the same encoded bits on two separated subcarriers with different constellation mapping schemes. Furthermore, a new lower density parity check (LDPC) tone mapper can be used when DCM is applied for a given resource unit (RU) when LDPC is used as the channel control coding. For HE PPDU transmission with DCM, LDPC encoded streams are first modulated by a DCM constellation mapper. The modulated symbols of the lower half of the frequency segment and the modulated symbols of the upper half of the frequency segment are modulated using the same LDPC encoded bits using DCM mapping. For example, for QPSK DCM, the modulated symbols of the lower half of the frequency segment are repeated and conjugated and mapped to the upper half of the frequency segment. The modulated symbols of the lower half of the frequency segment are mapped to lower half of the data subcarriers using DCM LDPC tone mapper. The modulated symbols of the upper half of the frequency segment are mapped to upper half of the data subcarriers using the same DCM LDPC tone mapper. Since the same LDPC tone mapper are applied for the upper half of the frequency segment and the lower half of the frequency segment, the maximum frequency diversity for DCM can be achieved.

In one embodiment, a source station encodes a data packet to be transmitted to a destination station over a resource unit (RU) in a wireless local area network. The source station modulates encoded bits to a first set of modulated symbols using a first modulation scheme, and modulates the same encoded bits to a second set of modulated symbols using a second modulation scheme if dual carrier modulation (DCM) is applied. The source station maps the first set of modulated symbols onto a first half of frequency subcarriers of the RU by a tone mapper, and maps the second set of modulated symbols onto a second half of frequency subcarriers of the RU by the same tone mapper. The source station transmits the data packet to the destination station. In one example, the tone mapper is a low density parity check (LDPC) tone mapper designed for dual carrier modulation.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
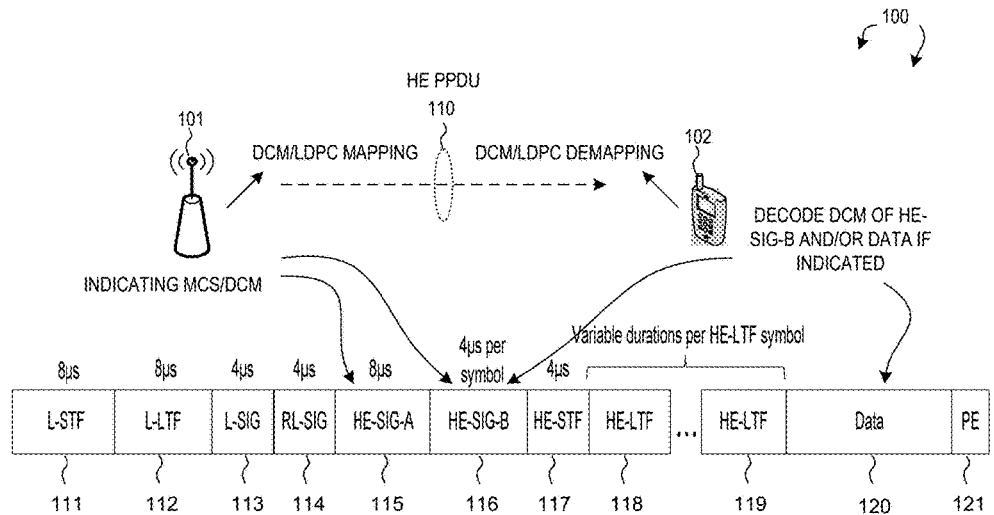
FIG. 1 illustrates a wireless communications system and a high efficiency HE PPDU frame structure supporting DCM transmission using LDPC in accordance with a novel aspect.

FIG. 1 illustrates a wireless communications system 100 and a high efficiency HE PPDU frame structure supporting dual carrier modulation (DCM) with low density parity check (LDPC) in accordance with a novel aspect. Wireless communications network 100 comprises a wireless access point AP 101 and a wireless station STA 102. In wireless communications systems, wireless devices communicate with each other through various well-defined frame structures. A frame comprises a Physical Layer Convergence Procedure (PLCP) Protocol Data Unit (PPDU), a frame header, and a payload. Frames are in turn divided into very specific and standardized sections. In FIG. 1, a high efficiency (HE) PPDU frame 110 is transmitted from AP 101 to STA 102. HE PPDU 110 comprises a legacy short training field (L-STF 111), a legacy long training field (L-LTF 112), a legacy signal field (L-SIG 113), a repeat legacy signal field (RL-SIG 114), a HE signal A field (HE-SIG-A 115), a HE signal B field (HE-SIG-B 116), a HE short training field (HE-STF 117), a HE long training field for data (HE-LTF 118), HE-data payload 120, and a Packet Extension (PE) 121.

Orthogonal Frequency Division Multiple Access (OFDMA) is introduced in HE WLAN to enhance the user experiences by assigning subsets of subcarriers to different users, allowing simultaneous data transmission by several users. In OFDMA, each user is assigned with a group of subcarriers called a resource unit (RU). In HE WLAN, an STA can transmit one minimum size RU (which is about 2 MHz bandwidth) in uplink OFDMA. Compared to its 20 MHz preamble, the power density of its data portion is 9 dB higher than its preamble. This narrow band uplink OFDMA signal is hard to be detected by CCA. Therefore, one STA can experience 9 dB higher interferences on subcarriers in a particular narrow band than other subcarriers. It can be seen that narrow band interferences are intrinsic in HE WLAN. A scheme to deal with the narrow band interferences is thus needed. In addition, under dense deployment, robustness with narrow-band interference is important to HW WLAN. Enhance the PER performance of HE-data portion can extend the range for outdoor scenarios. A new modulation scheme for HE-data that can operate at lower SNR than MCS0 is also desired.

HE-SIG-B is mainly for intended users. In Multi-User (MU) transmissions, performance of HE-SIG-B is encoded using 1× symbol duration. As a result, its performance is worse than data symbol with 4× symbol duration when used the same modulation and coding scheme (MCS). It is shown that extending CP from 0.8 us to 1.6 us or even 3.2 us is not effective in ensuring that SIG-B is reliable relative to data. A more robust modulation scheme is thus needed for HE-SIGB. HE-SIG-B may contain many bits for OFDMA/MU-MIMO transmissions. Given HE-SIG-B contains the information mainly for intended users, it is OK that not all other STAs receiving HE-SIG-B. The higher the MCS, the higher the efficiency. Therefore, variable MCS should be allowed for HE-SIG-B to enhance the efficiency.

Accordingly, dual sub-carrier modulation (DCM) is introduced in HE WLAN. DCM is a perfect solution to deal with narrow band interferences. DCM can introduce frequency diversity into OFDM systems by transmitting the same information on two subcarriers separated in frequency. For single user transmission, the DCM scheme modulates the same information on a pair of subcarrier n and m, i.e., $0<n<N_{SD}/2$ and $m=N_{SD}/2+n$, where $N_{SD}$ is total number of subcarriers in one resource unit. For OFDMA transmissions, one frequency resource block is assigned to a given user. The DCM schemes for the one frequency block is the same as OFDM case for single user.

A DCM indication scheme can be applied such that encoding and decoding of DCM is really simple. As depicted in FIG. 1, HE SIG-A 115 or HE SIG-B 116 comprises an MCS sub-field indicating the MCS and a DCM bit indicating whether DCM is applied for the subsequent HE SIG-B 116 or subsequent data payload 120 for that user. If DCM is applied and indicated, then the transmitter modulates the same encoded bits on two separated subcarriers with different mapping schemes. Furthermore, a new lower density parity check (LDPC) tone mapper can be used when DCM is applied for a given RU. For HE PPDU 110 transmission with DCM, LDPC encoded bit streams are first modulated by a DCM constellation mapper. The modulated symbols of the lower half of the frequency segment are repeated and conjugated and mapped to the upper half of the frequency segment. The modulated symbols of the lower half of the frequency segment are mapped to lower half of the data subcarriers using DCM LDPC tone mapper. The modulated symbols of the upper half of the frequency segment are mapped to upper half of the data subcarriers using the same DCM LDPC tone mapper.

Figure 2:
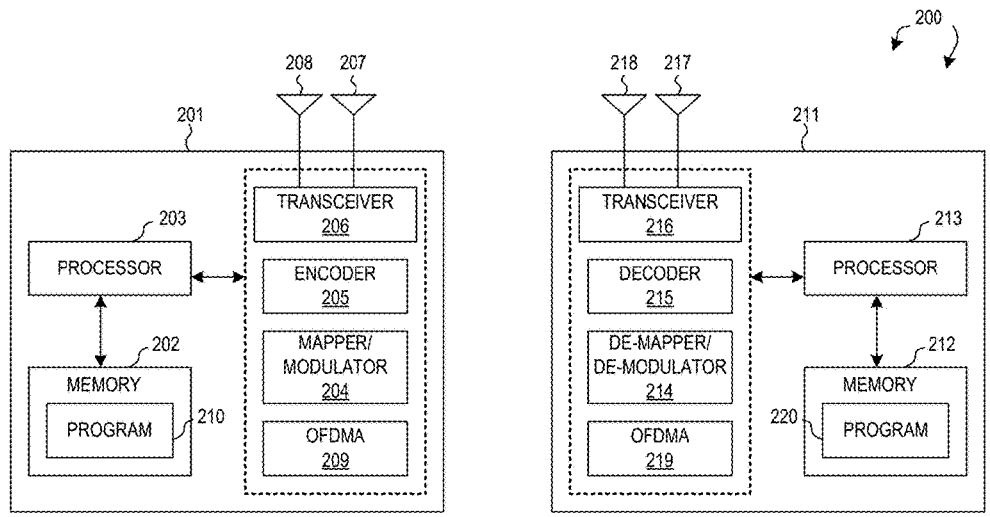
FIG. 2 is a simplified block diagram of a wireless transmitting device and a receiving device in accordance with a novel aspect.

FIG. 2 is a simplified block diagram of wireless devices 201 and 211 in accordance with a novel aspect. For wireless device 201 (e.g., a transmitting device), antennae 207 and 208 transmit and receive radio signal. RF transceiver module 206, coupled with the antennae, receives RF signals from the antennae, converts them to baseband signals and sends them to processor 203. RF transceiver 206 also converts received baseband signals from the processor, converts them to RF signals, and sends out to antennae 207 and 208. Processor 203 processes the received baseband signals and invokes different functional modules and circuits to perform features in wireless device 201. Memory 202 stores program instructions and data 210 to control the operations of device 201.

Similarly, for wireless device 211 (e.g., a receiving device), antennae 217 and 218 transmit and receive RF signals. RF transceiver module 216, coupled with the antennae, receives RF signals from the antennae, converts them to baseband signals and sends them to processor 213. The RF transceiver 216 also converts received baseband signals from the processor, converts them to RF signals, and sends out to antennae 217 and 218. Processor 213 processes the received baseband signals and invokes different functional modules and circuits to perform features in wireless device 211. Memory 212 stores program instructions and data 220 to control the operations of the wireless device 211.

The wireless devices 201 and 211 also include several functional modules and circuits that can be implemented and configured to perform embodiments of the present invention. In the example of FIG. 2, wireless device 201 is a transmitting device that includes an encoder 205, a symbol mapper/modulator 204, and an OFDMA module 209. Wireless device 211 is a receiving device that includes a decoder 215, a symbol de-mapper/de-modulator 214, and a OFDMA module 219. Note that a wireless device may be both a transmitting device and a receiving device. The different functional modules and circuits can be implemented and configured by software, firmware, hardware, and any combination thereof. The function modules and circuits, when executed by the processors 203 and 213 (e.g., via executing program codes 210 and 220), allow transmitting device 201 and receiving device 211 to perform embodiments of the present invention.

In one example, at the transmitter side, device 201 generates a HE PPDU frame, and inserts both MCS and DCM indication bit in a signal field of the HE PPDU frame. Device 201 then applies corresponding MCS and DCM and LDPC tone mapping and transmits the HE PPDU to the receiver. At the receiver side, device 211 receives the HE PPDU, and decodes the MCS and DCM indication bit. If the DCM indication bit is zero, then the receiver calculates the logarithm likelihood ratio (LLR) of a received bit for each subcarrier based on the indicated MCS. On the other hand, if the DCM indication bit is equal to one, then the receiver calculates the LLR by performing LLR combining of the upper subcarrier and the lower subcarrier of the resource unit. Various embodiments of such transmitting device and receiving device are now described below with accompany drawings.

Figure 3:
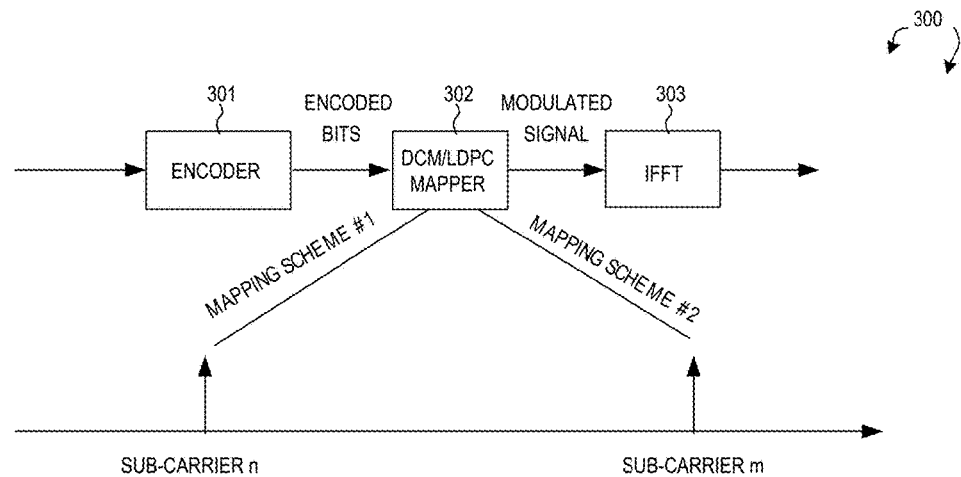
FIG. 3 is a simplified diagram of a transmitting device that applies DCM with LDPC tone mapping.

FIG. 3 is a simplified diagram of a transmitting device 300 that applies DCM modulation with LDPC tone mapping. The encoded bits of a RU (may go through a bit interleaver for BCC, not shown) output from encoder 301 is fed into the DCM/LDPC block 302. Encoder 301 may be an LDPC encoder. DCM/LDPC 302 modulates the same encoded bits on two separate sub-carriers with possibly different mapping schemes. For example, as shown in FIG. 3, subcarrier n and subcarrier m carry the same bit information. Subcarrier n is the lower subcarrier and is applied with mapping scheme #1, subcarrier m is the upper subcarrier and is applied with mapping scheme #2. The modulated signals are then mapped onto data subcarriers of the RU using LDPC tone mapping and then fed into IFFT 303 and to be transmitted.

Assume the modulated signal for subcarrier n and subcarrier m are denoted as $s_n$ and $s_m$ respectively. For BPSK DCM, $s_n$ and $s_m$ can be obtained by mapping 1-bit encoded bit $b_0$ on two identical or different BPSK constellation (e.g., BPSK and SBPSK). For example, one BPSK DCM mapping scheme can be $$s_n = 1 - 2b_0$$

$$s_m = (1 - 2b_0)e^{jm\pi}$$

For QPSK DCM, $s_n$ and $s_m$ can be obtained by mapping 2-bit encoded stream $b_0$ $b_1$ on two identical or different QPSK constellation. For example, $s_n$ can be mapped using QPSK and $s_m$ can be mapped using staggered quadrature phase-shift keying (SQPSK) or other rotated QPSK schemes, respectively.

Figure 4:
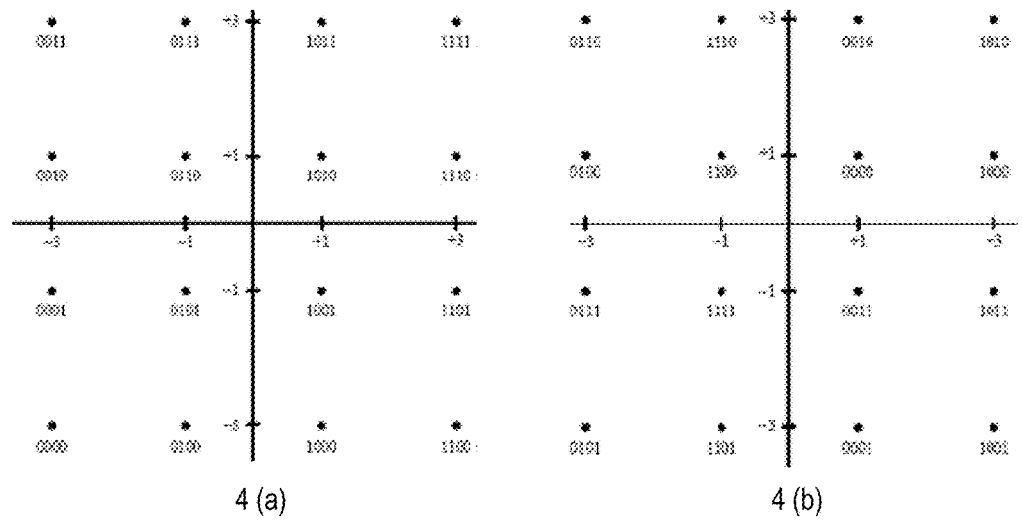
FIG. 4 illustrates one example of modulation mapping scheme for 16QAM DCM.

FIG. 4 illustrates one example of modulation mapping scheme for 16QAM DCM. For 16QAM DCM, $s_n$ and $s_m$ are obtained by mapping a 4-bit stream $b_0b_1b_2b_3$ on two different 16QAM constellation respectively. As shown in FIG. 4, $s_n$ is modulated using constellation scheme shown in 4(a) and $s_m$ is modulated using constellation scheme shown in 4(b):

$$s_n = [1 \quad 2 \quad j \quad 2j]\begin{bmatrix}B_0\\B_1\\B_2\\B_3\end{bmatrix} \quad s_m = [2 \quad -1 \quad 2j \quad -j]\begin{bmatrix}B_0\\B_1\\B_2\\B_3\end{bmatrix}$$

Where $$B_i = \begin{cases} -1, & b_i = 0 \\ +1, & b_i = 1 \end{cases}$$

For higher modulation schemes such as 64QAM and 256QAM, DCM can also be applied using two different mapping schemes for Sn and Sm on the same encoded bit stream. Modulations higher than 16QAM is not recommended for DCM. This is because DCM may reduce data rate for higher modulation to achieve higher performance.

Figure 5:
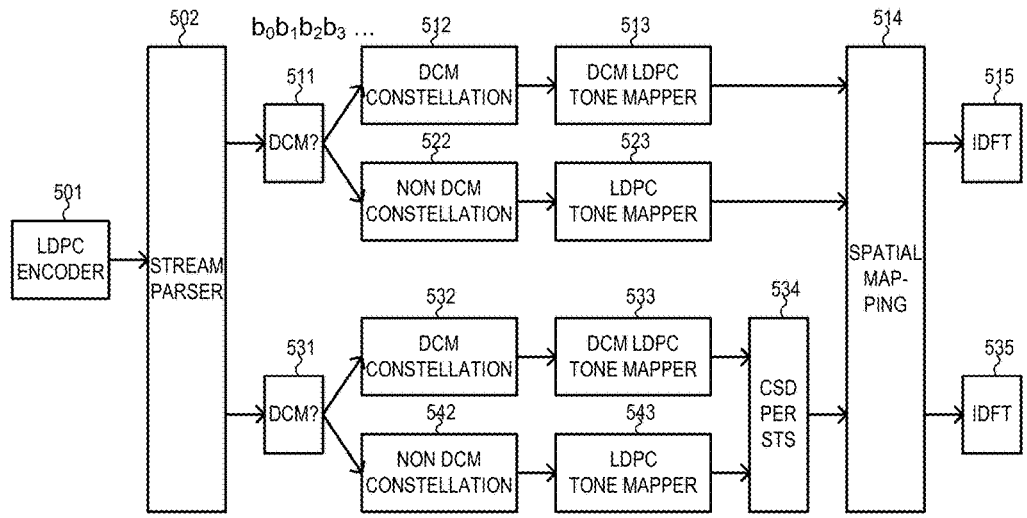
FIG. 5 illustrates a transmission procedure of DCM using LDPC tone mapping.

FIG. 5 illustrates a transmission procedure of DCM using LDPC and LDPC tone mapper. A transmitter of a wireless device comprises an LDPC encoder 501, a stream parser 502, selectors 511/531, DCM constellation mappers 512/532, DCM LDPC tone mappers 513/533, non-DCM constellation mappers 522/542, LDPC tone mappers 523/543, a cyclic shift delay (CSD) circuit 534 per stream, a spatial mapper 514, and Inverse Discrete Fourier Transform (IDFT) circuits 515/535. LDPC encoder 501 encodes data information into a long bit stream, which is parsed by stream parser 502 into multiple bit streams. Each bit stream is then modulated and mapped onto data subcarriers of a corresponding RU. For example, if DCM is applied, then each bit stream ($b_0b_1b_2b_3$ ...) is modulated by DCM constellation mapper 512 and mapped by DCM LDPC tone mapper 513, which is further mapped by spatial mapper 514, and passed to IDFT 515 to be transmitted out. On the other hand, if DCM is not applied, then each bit stream ($b_0b_1b_2b_3$ ...) is modulated by non-DCM constellation mapper 522 and mapped by LDPC tone mapper 523, which is further mapped by spatial mapper 514, and passed to IDFT 515 to be transmitted out.

Figure 6:
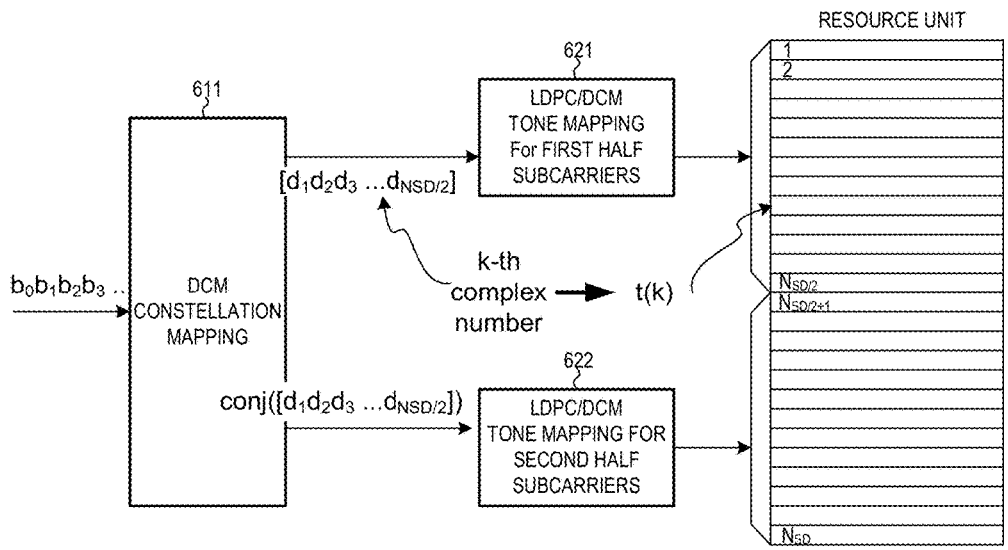
FIG. 6 illustrates one example of LDPC tone mapper when DCM is applied for a given RU.

FIG. 6 illustrates one example of LDPC tone mapper when DCM is applied for a given resource unit (RU). In the example of FIG. 6, LDPC encoded bit streams, $b_0b_1b_2b_3 \ldots$, are mapped by DCM constellation mapper 611, and then mapped by two identical DCM LDPC tone mappers 621 and 622, respectively. Let $N_{SD}$ be the number of data subcarriers in one resource Unit (RU). For a LDPC encoded bit stream, $b_0b_1b_2b_3 \ldots$, when DCM modulation is used, then the DCM constellation mappers and DCM LDPC tone mappers are applied. For example, for QPSK DCM modulation, $b_0b_1$ is modulated as $d_1$ and $d_{N_{SD/2+1}}$. The coded/interleaved bits are modulated as QPSK and mapped to the lower half frequency segment: $[d_1, d_2, \ldots d_{N_{SD/2}}]$; The modulated symbols of the lower half frequency segment are repeated and conjugated and then mapped to the upper half frequency segment: $[d_{N_{SD/2+1}}, d_{N_{SD/2+2}}, \ldots d_{N_{SD}}]=\text{conj}([d_1, d_2, \ldots d_{N_{SD/2}}])$. $[d_1, d_2, \ldots d_{N_{SD/2}}]$ are then mapped to data subcarriers $[1, 2, \ldots N_{SD/2}]$ using DCM LDPC tone mapper 621, and $[d_{N_{SD/2+1}}, d_{N_{SD/2+2}}, \ldots d_{N_{SD}}]$ are mapped to data subcarriers $[N_{SD/2+1}, N_{SD/2+1}, \ldots N_{SD}]$ using the same DCM LDPC tone mapper 622. DCM LDPC tone mappers 621 and 622 are the same.

In the next generation WLAN systems that is based on upcoming IEEE 801.11ax standards, each station (STA) can transmit signals using one or more resource units (RU). The RU size can be 26, 52, 106, 242, 484, or 996 tones with tone spacing of about 78.1 kHz. Correspondingly, the number of data tones $N_{SD}$ for each RU is 24, 48, 102, 234, 468, and 980, respectively. When DCM is applied for a given RU, the number of complex numbers generated using DCM of a given stream is the half of the number of data tones of the RU, i.e., $N_{SD}/2$. For example, if the RU size is 102, then the number of complex number generated using DCM is $N_{SD}/2=51$. The generated complex numbers will be mapped to data tones of the first half and the data tones of the second half of the frequency segments of the RU. The first half frequency segment of a RU contains tones 1 to $N_{SD}/2$, and the second half frequency segment of a RU contains tones $N_{SD}/2$ to tones $N_{SD}$, where $N_{SD}$ is the RU size.

Figures 7, 8:
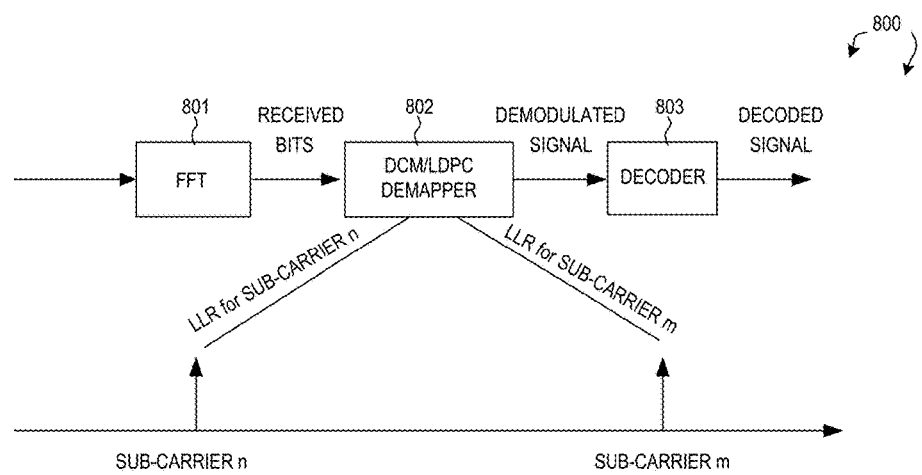
FIG. 7 illustrates one embodiment of LDPC tone mapper for DCM.
FIG. 8 is a simplified diagram of a receiving device that applies DCM de-modulation with LDPC de-mapping.

FIG. 7 illustrates one embodiment of LDPC tone mapper for DCM. For a HE PPDU transmission without DCM, the LDPC tone mapping for LDPC-coded streams corresponding to user u in the r-th RU is done by permuting the stream of complex numbers generated by the constellation mappers to the following, where $N_{SD}$ is the total number of data tones in the r-th RU.

$$d''_{t(k),i,n,l,r,u} = d'_{k,i,n,l,r,u};$$

$$k = 0, 1, \ldots, N_{SD} - 1 \text{ for a } RU \text{ of } 26, 52, 106, 242, 484, \text{ and } 996 \text{ tones}$$

$$k = 0, 1, \ldots, \frac{N_{SD}}{2} - 1 \text{ for a } RU \text{ of } 996 \times 2 \text{ tones}$$

$$i = 1, K, N_{SS,r,u}$$

$$n = 0, 1, K, N_{SYM} - 1$$

$$l = 0 \text{ for a } RU \text{ of } 26, 52, 106, 242, 494, \text{ and } 996 \text{ tones}$$

$$l = 0, 1 \text{ for a } RU \text{ of } 996 \times 2 \text{ tones}$$

$$u = 0, K, N_{user,r} - 1$$

$$r = 0, K, N_{RU} - 1$$

The LDPC tone mapper maps the k-th complex number generated by the constellation mappers to the t(k)-th subcarrier as the following, where $D_{TM}$ is the LDPC tone mapping distance for the r-th RU.

$$t(k) = \begin{cases} D_{TM}\left(k \bmod \frac{N_{SD}}{D_{TM}}\right) + \left\lfloor \frac{k \cdot D_{TM}}{N_{SD}} \right\rfloor, & \text{for a } RU \text{ of 26, 52, 106,} \\ & \text{242, 484, and 996 tones} \\ D_{TM}\left(k \bmod \frac{N_{SD}/2}{D_{TM}}\right) + \left\lfloor \frac{k \cdot D_{TM}}{N_{SD}/2} \right\rfloor, & \text{for a } RU \text{ of } 996 \times 2 \text{ tones} \end{cases}$$

For a HE PPDU transmission with DCM, the LDPC tone mapping for LDPC-coded streams corresponding to user u in the r-th RU is done by permuting the stream of complex numbers generated by the constellation mappers to the following, where $N_{SD}$ is the total number of data tones in the r-th RU.

$$d''_{t(k),i,n,l,r,u} = \begin{cases} d'_{k,i,n,l,r,u}; \\ d'_{k,i,n,l,r,u}; \end{cases}$$

$$k = 0, 1, \ldots, \frac{N_{SD}}{2} - 1$$

$$k' = k - \frac{N_{SD}}{2}, \text{ for } k = \frac{N_{SD}}{2}, \frac{N_{SD}}{2} + 1, \ldots, N_{SD} - 1$$

$$i = 1, K, N_{SS,r,u}$$

$$n = 0, 1, K, N_{SYM} - 1$$

$$l = 0 \text{ for a } RU \text{ of } 26, 52, 106, 242, 494, \text{ and } 996 \text{ tones}$$

$$l = 0, 1 \text{ for a } RU \text{ of } 996 \times 2 \text{ tones}$$

$$u = 0, K, N_{user,r} - 1$$

$$r = 0, K, N_{RU} - 1$$

The DCM LDPC tone mapper maps the k-th complex number generated by the constellation mappers to the t(k)-th subcarrier as the following (refer back to FIG. 6), where $D_{TM\_DCM}$ is the LDPC tone mapping distance for the r-th RU when DCM is applied.

$$t(k) = \begin{cases} D_{TM\_DCM}\left(k \bmod \frac{N_{SD}/2}{D_{TM\_DCM}}\right) + \\ \left\lfloor \frac{k \cdot D_{TM\_DCM}}{N_{SD}/2} \right\rfloor, & \text{for a } RU \text{ of 26, 52, 106,} \\ & \text{242, 484, and 996 tones} \\ D_{TM\_DCM}\left(k' \bmod \frac{N_{SD}/2}{D_{TM\_DCM}}\right) + \\ \left\lfloor \frac{k' \cdot D_{TM\_DCM}}{N_{SD}/2} \right\rfloor + \frac{N_{SD}}{2}, & \text{for a } RU \text{ of 26, 52, 106,} \\ & \text{242, 484, and 996 tones} \\ D_{TM\_DCM}\left(k \bmod \frac{N_{SD}/2}{D_{TM\_DCM}}\right) + \\ \left\lfloor \frac{k \cdot D_{TM\_DCM}}{N_{SD}/2} \right\rfloor, & \text{for a } RU \text{ of } 996 \times 2 \text{ tones} \end{cases}$$

In the example of Table 700, the DCM LDPC tone mapping shall be performed on all LDPC encoded streams mapped in a RU as described above. When DCM is applied to LDPC encoded streams, $D_{TM\_DCM}$ shall be applied on both the lower half data subcarriers in a RU and the upper half data subcarriers of the RU. The LDPC tone-mapping distance parameter $D_{TM}$ and $D_{TM\_DCM}$ are constant for each RU size and the values for different RU sizes are given in Table 700. The $D_{TM\_DCM}$ LDPC tone mapper guarantees that each two consecutively generated complex constellation numbers will be transmitted on two data tones that are separated by at least ($D_{TM\_DCM}-1$) from other data tones. Each $D_{TM\_DCM}$ corresponds to a different LDPC tone mapper, which is equivalent to a block interleaver.

The two frequency subcarriers used for DCM can be pre-determined. For example, for single user transmission, DCM modulation can be applied to subcarrier k and k+N/2, where N is the total number of subcarriers in one OFDM symbol or RU. For OFDMA transmission, DCM modulation can be applied to two equal frequency resource blocks assigned to a given user. The transmission method of using DCM can be implemented even with interferences presented in one frequency band or frequency resource block. For example, for non-WiFi signals or OBSS signals, different clear channel assessment (CCA) threshold can be applied for two frequency bands.

FIG. 8 is a simplified diagram of a receiving device 800 that applies DCM de-modulation with LDPC de-mapping. At the receiver, the received signal through FFT 801 can be written as:

$r_n = h_n s_n + v_n$      Upper subcarrier $r_m = h_m s_m + v_m$      Lower subcarrier Where
- $h_n$ and $h_m$ are channel response matrixes for subcarriers n and m
- $v_n$ and $v_m$ are modeled as AWGN noise The de-mapper/demodulator 802 of the receiver can calculate the logarithm likelihood ratio (LLR) of a received bit by combining the received signals from the upper subcarrier and the lower subcarrier if the SNR is considered "good" for the upper and lower subcarriers. Alternatively, the receiver can choose to calculate the LLR of a received bit just from the upper subcarrier or from the lower subcarrier if the SNR is considered "bad" for the lower or the upper subcarriers, respectively. The demodulated signal is then fed to decoder 803 for outputting the decoded signal.

There are many advantages of using DCM. No latency is added for modulation within one OFDM symbol. No extra complexity is introduced at modulator and demodulator. For modulation, no extra complexity, just modulate the subcarriers in the upper band and the subcarriers in lower band the similar way. For demodulation, LLR calculation is really simple. For QPSK, just add two LLRs. For 16QAM, just need a few simple additional subtractions. Simulation results show that PER performance improve more than 2 dB gain for MCS0 and MCS2 in 4× symbol. Such performance gain is significant. For wider bandwidth (>20 MHz), larger performance gain can be expected due to larger frequency diversity gain. Error floor is also reduced for outdoor channels. Overall, the DCM scheme results in more robustness to sub-band interferences and provides a very good data rate vs. PER tradeoff between QPSK rate code and 16QAM ½ rate code.

Figure 9:
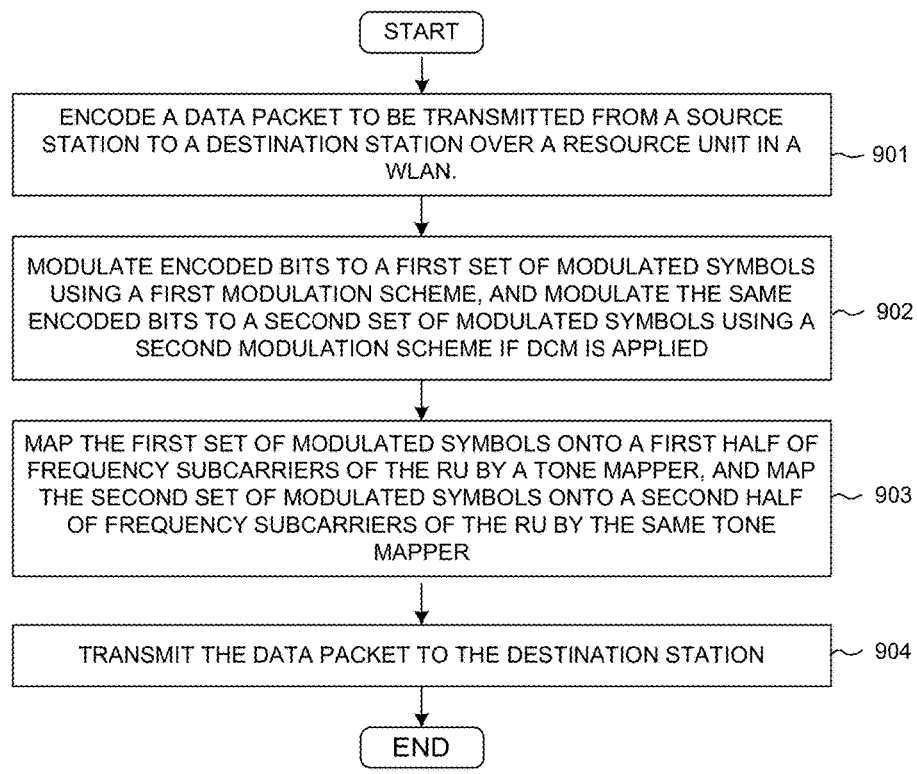
FIG. 9 is flow chart of a method of transmitting and encoding a HE PPDU frame with DCM using LDPC tone mapping in accordance with a novel aspect.

FIG. 9 is flow chart of a method of transmitting and encoding a HE PPDU frame with DCM using LDPC tone mapping in accordance with a novel aspect. In step 901, a source station encodes a data packet to be transmitted to a destination station over a resource unit (RU) in a wireless local area network. In step 902, the source station modulates encoded bits to a first set of modulated symbols using a first modulation scheme, and modulates the same encoded bits to a second set of modulated symbols using a second modulation scheme if dual carrier modulation (DCM) is applied. In step 903, the source station maps the first set of modulated symbols onto a first half of frequency subcarriers of the RU by a tone mapper, and maps the second set of modulated symbols onto a second half of frequency subcarriers of the RU by the same tone mapper. In step 904, the source station transmits the data packet to the destination station. In one example, the tone mapper is a low density parity check (LDPC) tone mapper designed for dual carrier modulation.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
   encoding a data packet to be transmitted from a source station to a destination station over a resource unit (RU) in a wireless local area network;
   modulating encoded bits to a first set of modulated symbols using a first modulation scheme, and modulating the encoded bits to a second set of modulated symbols using a second modulation scheme if dual carrier modulation (DCM) is applied;
   mapping the first set of modulated symbols onto a first half of frequency subcarriers of the RU by a tone mapper, and mapping the second set of modulated symbols onto a second half of frequency subcarriers of the RU by the tone mapper; and
   transmitting the data packet to the destination station.

2. The method of claim 1, wherein the first modulation scheme and the second modulation scheme are based on a same modulation order.

3. The method of claim 1, wherein the first set of modulated symbols corresponds to a upper half of a frequency segment of the RU, and wherein the second set of modulated symbols corresponds to a lower half of the frequency segment of the RU.

4. The method of claim 1, wherein a number of complex numbers generated by the first and the second modulation schemes is one half of a total number of subcarriers contained in the RU.

5. The method of claim 1, wherein the tone mapper is used for low density parity check (LDPC) channel control coding.

6. The method of claim 5, wherein the tone mapper maps each complex number generated by the first modulation scheme onto a subcarrier associated with the first half of the frequency subcarriers of the RU.

7. The method of claim 5, wherein the tone mapper maps each complex number generated by the second modulation scheme onto a subcarriers associated with the second half of the frequency subcarriers of the RU.

8. The method of claim 5, wherein the tone-mapper is a block interleaver with a constant distance for each RU size.

9. The method of claim 5, wherein an LDPC tone-mapping distance when DCM is applied is different from an LDPC tone-mapping distance when DCM is not applied.

10. The method of claim 1, further comprising:
    determining whether DCM is applied for the encoded bits; and
    performing non-DCM modulation and tone mapping if DCM is not applied for the encoded bits.

11. A wireless station, comprising:
    an encoder operable to encode a data packet to be transmitted to a destination station over a resource unit (RU) in a wireless local area network;
    a modulator operable to modulate encoded bits to a first set of modulated symbols using a first modulation scheme, and also to modulate the encoded bits to a second set of modulated symbols using a second modulation scheme if dual carrier modulation (DCM) is applied;

a tone mapper operable to map the first set of modulated symbols onto a first-half of frequency subcarriers of the RU by a tone mapper, and also to map the second set of modulated symbols onto a second-half of frequency subcarriers of the RU by the tone mapper; and a transmitter operable to transmit the data packet to the destination station.

12. The wireless station of claim 11, wherein the first modulation scheme and the second modulation scheme are based on a same modulation order.

13. The wireless station of claim 11, wherein the first set of modulated symbols corresponds to an upper half of a frequency segment of the RU, and wherein the second set of modulated symbols corresponds to a lower half of the frequency segment of the RU.

14. The wireless station of claim 11, wherein a second number of complex numbers generated by the first and the second modulation schemes is one half of a total number of subcarriers contained in the RU.

15. The wireless station of claim 11, wherein the tone mapper is used for low density parity check (LDPC) channel control coding.

16. The wireless station of claim 15, wherein the tone mapper is operable to map each complex number generated by the first modulation scheme onto a subcarrier belonging to the first half of frequency subcarriers of the RU.

17. The wireless station of claim 15, wherein the tone mapper is operable to map each complex number generated by the second modulation scheme onto a subcarrier belonging to the second half of the frequency subcarriers of the RU.

18. The wireless station of claim 15, wherein the tone-mapper is a block interleaver with a constant distance for each RU size.

19. The wireless station of claim 15, wherein an LDPC tone-mapping distance when DCM is applied is different from an LDPC tone-mapping distance when DCM is not applied.

20. The wireless station of claim 11, wherein the wireless station is operable to determine whether DCM is applied for the encoded bits and to perform non-DCM modulation and tone mapping if DCM is not applied for the encoded bits.

* * * * *